(12) United States Patent
Takata et al.

(10) Patent No.: US 11,204,899 B1
(45) Date of Patent: Dec. 21, 2021

(54) FILE STORAGE SYSTEM AND FILE MANAGEMENT METHOD BY FILE STORAGE SYSTEM

(71) Applicant: HITACHI, LTD., Tokyo (JP)

(72) Inventors: Masanori Takata, Tokyo (JP); Shimpei Nomura, Tokyo (JP); Yuto Kamo, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/210,854

(22) Filed: Mar. 24, 2021

(30) Foreign Application Priority Data

Jan. 21, 2021 (JP) .............................. JP2021-007742

(51) Int. Cl.
*G06F 16/188* (2019.01)
*G06F 16/16* (2019.01)
*G06F 16/172* (2019.01)
*G06F 16/17* (2019.01)

(52) U.S. Cl.
CPC .......... *G06F 16/188* (2019.01); *G06F 16/162* (2019.01); *G06F 16/172* (2019.01); *G06F 16/1734* (2019.01)

(58) Field of Classification Search
CPC .... G06F 16/188; G06F 16/162; G06F 16/172; G06F 16/1734
See application file for complete search history.

(56) References Cited

U.S. PATENT DOCUMENTS

| | | | |
|---|---|---|---|
| 10,762,049 B1* | 9/2020 | Liang | G06F 11/323 |
| 2010/0088317 A1* | 4/2010 | Bone | G06F 16/134 |
| | | | 707/737 |
| 2016/0078248 A1* | 3/2016 | Price | G06F 21/6209 |
| | | | 707/785 |
| 2016/0359740 A1* | 12/2016 | Parandehgheibi | G06F 16/137 |
| 2017/0192989 A1* | 7/2017 | Georgiev | G06F 3/067 |
| 2019/0147086 A1* | 5/2019 | Pal | G06F 16/24545 |
| | | | 707/718 |
| 2020/0026784 A1* | 1/2020 | Miyoshi | G06F 16/1744 |
| 2021/0117232 A1* | 4/2021 | Sriharsha | G06F 17/18 |

* cited by examiner

*Primary Examiner* — Matthew J Ellis

(74) *Attorney, Agent, or Firm* — Volpe Koenig

(57) ABSTRACT

When an operation request of a file is made, a first storage system performs an operation of the file stored in the first storage system on the basis of the operation request, describes, in an operation log, a counter value of a management information file, associated with the file on which the operation is to be performed, together with operation content with respect to the file, replies to the operation request, and updates the counter value of the management information file when the file stored in the first storage system is transferred to a second storage system.

8 Claims, 13 Drawing Sheets

Operation log 500

| Operation type | File handler | Type | Offset | Length | Counter | Timestamp |
|---|---|---|---|---|---|---|
| create | 0x100000 | File | 0 | 1024 | 0 | T0 |
| create | 0x000000 | Directory | - | - | 0 | T1 |
| write | 0x100011 | File | 256 | 512 | 10 | T2 |
| write | 0x111111 | File | 0 | 4096 | 20 | T3 |
| Replication | 0x100000 | File | 0 | 1024 | 1 | T4 |
| Replication | 0x100011 | File | 0 | 512 | 11 | T5 |
| Replication | 0x111111 | File | 0 | 512 | 21 | T6 |
| Replication | 0x000000 | Directory | - | - | 1 | T7 |
| write | 0x111111 | File | 1024 | 512 | 21 | T8 |
| Stub | 0x100011 | File | 0 | 512 | 12 | T9 |
| write | 0x100011 | File | 0 | 512 | 12 | T10 |

FIG. 6

FILE STORAGE SYSTEM AND FILE MANAGEMENT METHOD BY FILE STORAGE SYSTEM

CROSS-REFERENCE TO PRIOR APPLICATION

This application relates to and claim the benefit of priority from Japanese Patent Application No. 2021-7742 filed on Jan. 21, 2021 the entire disclosure of which is incorporated herein by reference.

BACKGROUND

The present invention relates to a file storage system and a file management method by the file storage system.

Preferably, the present invention relates to a technique for ensuring consistency of data between nodes of a distributed file system.

A computer system is known that implements data transfer between storage apparatuses which are respectively installed at a plurality of locations and which are coupled to an object storage apparatus.

A computer system (a file storage system) disclosed in the present specification provides a function of replicating (migrating) a user file, stored in a storage apparatus installed at a location, to an object storage. Also provided is a stubbing function of deleting data of a user file, which is hardly accessed from the storage apparatus installed at a location, but retaining the metadata, and a recall function of acquiring data from the object storage when, once again, referencing a stubbed user file. These functions that are provided through cooperation of the storage apparatuses installed at these locations and the object storage are referred to as a file virtualization function.

In addition, a scale-out distributed file system is known in which a storage apparatus at each location is constituted by a plurality of nodes.

In order to make a file virtualization function highly reliable, protection by journaling is necessary to prevent loss of metadata that manages an application status of file virtualization so that consistency of data is ensured even in the event of a failure such as power interruption. In a distributed file system, since a plurality of nodes store a user file, data consistency between the nodes has to be ensured.

With the technique disclosed in U.S. Patent Application Publication No. 2017/0192989, between data and metadata (a data management file), a journal is only applied to metadata. In addition, a unique pseudo-timestamp is shared by clusters, and reliability is improved by creating a journal, to which the pseudo-timestamp is attached, for a data operation to be accepted by a plurality of nodes.

However, with the technique disclosed in U.S. Patent Application Publication No. 2017/0192989, an access conflict occurs from the plurality of nodes to a single resource that is the pseudo-timestamp. In addition, since the pseudo-timestamp is first added before attachment to a client IO, response performance to a client IO declines. Furthermore, a storage destination of a journal to be updated differs from a client IO receiving node and causes a decline in response performance.

Therefore, it is desired that consistency of management information of file virtualization in a distributed file system be ensured while preventing a decline in IO performance of a client.

The present invention has been made in consideration of the circumstances described above and an object thereof is to provide a file storage system and a file management method in the file storage system which enable consistency of management information of file virtualization in a distributed file system to be ensured while preventing a decline in IO performance of a client.

SUMMARY

A file storage system according to an aspect of the present invention is a file storage system constituted of a plurality of nodes having a processor and a storage apparatus, the file storage system including a first storage system configured to store a file by a distributed file system and perform input/output of the file for a client and a second storage system to which the file stored in the first storage system is transferred, the file storage system implementing a file virtualization function by the first storage system and the second storage system, wherein the file storage system has a management information file, which includes a counter value indicating a time-series sequence and which is provided for each file, and an operation log in which operation content of the file is described together with the counter value, and the first storage system is configured to: perform an operation of the file stored in the first storage system on the basis of an operation request with respect to the file, describe, in the operation log, the counter value of the management information file, associated with the file on which the operation is to be performed, together with the operation content with respect to the file, and reply to the operation request; and update the counter value of the management information file when the file stored in the first storage system is transferred to the second storage system.

According to the present invention, a file storage system and a file management method in the file storage system which enable consistency of management information of file virtualization in a distributed file system to be ensured while preventing a decline in IO performance of a client can be implemented.

BRIEF DESCRIPTION OF THE DRAWINGS

FIG. 6 represents an example of an operation log related to the file storage system according to the embodiment;

DETAILED DESCRIPTION OF THE EMBODIMENT

Figure 1:
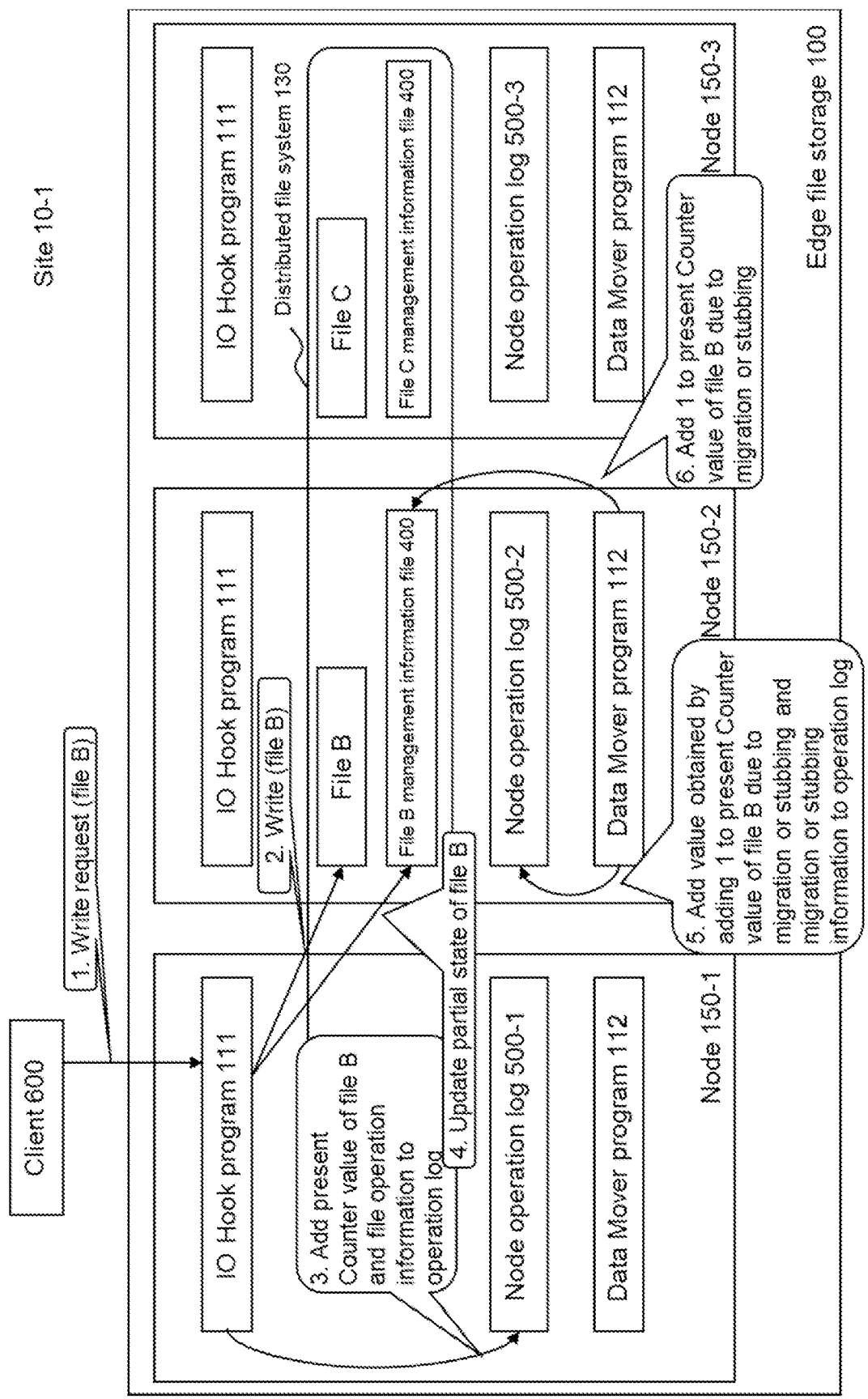
FIG. 1 is a diagram for explaining an example of an outline of a file storage system according to an embodiment.

Hereinafter, an embodiment of the present invention will be described with reference to the drawings. It should be noted that the embodiment described below is not intended to limit the invention as set forth in the accompanying claims and that all of the elements described in the embodiment and combinations thereof are not necessarily essential to solutions proposed by the invention.

In the following description, a "memory" refers to one or more memories and may typically be a main storage device. At least one memory in a memory unit may be a volatile memory or a non-volatile memory.

In addition, in the following description, a "processor" refers to one or more processors. While at least one processor is typically a microprocessor such as a CPU (Central Processing Unit), the processor may be a processor of another type such as a GPU (Graphics Processing Unit). At least one processor may be a single-core processor or a multi-core processor.

Furthermore, at least one processor may be a processor in a broad sense of the term such as a hardware circuit (for example, an FPGA (Field-Programmable Gate Array) or an ASIC (Application Specific Integrated Circuit)) that performs a part of or all of a processing step.

In the present disclosure, a storage apparatus (device) includes a single storage drive such as a single HDD (Hard Disk Drive) or a single SSD (Solid State Drive), a RAID apparatus including a plurality of storage drives, and a plurality of RAID apparatuses. In addition, when the drive is an HDD, the storage apparatus (device) may include an SAS (Serial Attached SCSI) HDD or an NL-SAS (near-line SAS) HDD.

In addition, although information that enables an output to be obtained in response to an input will be described below using expressions such as an "xxx table", the information may be data of any structure or may be a learning model such as a neural network that generates an output with respect to an input. Therefore, an "xxx table" can be referred to as "xxx information".

Furthermore, while expressions such as an "identifier", a "name", and an "ID" are used to represent identification information when describing contents of the respective pieces of information, these expressions are interchangeable. A wide variety of identification information may be used in place of at least one of these expressions.

In addition, in the following description, a configuration of each table merely represents an example and one table may be divided into two or more tables and all of or a part of two or more tables may constitute one table.

Furthermore, a "program" is sometimes used as a subject when describing processing steps in the following description. Since a program causes a prescribed processing step to be performed by appropriately using a storage resource (such as a memory) and/or a communication interface device (such as a port) when being executed by a processor, a program may be used as a subject of the processing step. A processing step described using a program as a subject may be considered a processing step performed by a processor or by a computer including the processor.

In the following description, when an operating entity such as a "xx unit" is described, this means that a processor of an information processing apparatus constituting the file storage system reads and loads processing contents of the xx unit being a program stored in a memory and realizes functions (to be described in detail later) of the xx unit.

The program may be installed on an apparatus such as a computer or may be a recording medium (for example, a non-transitory recording medium) that can be read by a program distribution server or the computer. In addition, in the following description, two or more programs may be realized as one program or one program may be realized as two or more programs.

In diagrams illustrating an embodiment, portions having a same function will be denoted by a same reference sign and repetitive descriptions thereof will be omitted.

In addition, in the following description, when describing elements of a same type without distinguishing the elements from one another, a reference sign (or a common sign among reference signs) may be used, but when describing elements of a same type by distinguishing the elements from one another, identification numbers (or reference signs) of the elements may be used.

In order to facilitate understanding of the invention, positions, sizes, shapes, ranges, and the like of the respective components shown in the drawings may not represent actual positions, sizes, shapes, ranges, and the like. Consequently, the present invention is not necessarily limited to the positions, sizes, shapes, ranges, and the like being disclosed in the drawings.

As an example, the file storage system according to the present embodiment is configured as follows.

Specifically, the file storage system according to the present embodiment includes a plurality of file storage apparatuses at respective locations, a file storage apparatus of a data center to be coupled to the plurality of file storage apparatuses at the respective locations, and an object storage apparatus of the data center.

Each file storage apparatus is constituted by a plurality of nodes and configured to store a file system and to store a path of an element in the file system and an archive destination of the element in the object storage apparatus by associating the path and the archive destination with each other. When the file system is updated at a request from a client, operation contents thereof are added to an operation log inside a host node and, at the same time, a management information file is updated for each element that is a target of an operation. At this point, a counter is provided for each file and a present value of the counter is included in the operation log. The value of the counter for each file is not updated when the file system is updated at a request from a client. Accordingly, a decline in response performance of a client IO is prevented.

In addition, when a file virtualization function executes migration processing and stubbing processing, a value obtained by increment to the value of the counter of the file is added to the operation log. Furthermore, 1 is also added to a counter value in the management information file corresponding to the file. Accordingly, a state of the file that enables a file system update at the request from a client and a time-sequential relationship due to file virtualization to be comprehended or, in other words, a final state of the file can be uniquely determined and consistency of management information of file virtualization can be made recoverable.

FIG. 1 is a diagram for explaining an example of an outline of the file storage system according to the present embodiment.

A site 10-1 includes an Edge file storage (the first storage system) 100 which represents an example of a file storage apparatus. The Edge file storage 100 has a plurality of nodes 150. The Edge file storage 100 according to the present embodiment is constituted by three nodes 150-1, 150-2, and 150-3.

The Edge file storage 100 provides a client 600 with a file sharing service and has a distributed file system 130. The Edge file storage 100 is capable of respectively executing operations with respect to a file and a directory which are elements in the file system 130.

The node 150 that constitutes the Edge file storage 100 has an IO Hook program 111 and a Data Mover program 112 and realizes the file sharing service. The IO Hook program 111 detects operations with respect to a file and a directory stored in the file system 130 and adds operation contents to an operation log 500 of each node 150. In addition, the IO Hook program 111 stores a management information file 400 that corresponds to a file and to a directory in the distributed file system 130. In this case, the operation log 500 is provided in each node 150 in order to reduce accesses between nodes 150 for accessing the operation log 500.

The Data Mover program 112 transfers the file and the directory detected by the IO Hook program 111 to an object storage (the second storage system, refer to FIG. 2) 300. Purposes of the transfer include backup and archiving. The Data Mover program 112 adds information to the effect that replication to the object storage 300 has been performed to the operation log 500 of each node 150. In addition, the Data Mover program 112 performs stubbing processing which deletes data of the file having been replicated to the object storage 300 from the Edge file storage 100. In doing so, the Data Mover program 112 similarly adds information to the effect that stubbing has been performed to the operation log 500 of each node 150.

A specific example of file processing related to the operation log 500 to be used in consistency recovery will now be described. In the following description, numbers in brackets correspond to numbers of balloons shown in FIG. 1.

(1) The client 600 performs an operation with respect to the file system 130. A content of the operation is, for example, "data update" with respect to a file B of the file system 130 of the Edge file storage 100 that is an operation target. In this case, an example of updating data to the file B is shown.

(2) Next, the IO Hook program 111 detects a data update with respect to the file B and executes the data update with respect to the file B.

(3) The IO Hook program 111 adds a present value of a Counter 414 (refer to FIG. 5) of the file B and information on the file update to the operation log 500.

(4) The IO Hook program 111 stores information on a detected update range of the file B as a change in a partial state to metadata of the file B, another file, a database, or the like. The present embodiment shows an example of a file B management information file 400.

(5) The Data Mover program 112 adds, after executing migration processing or stubbing processing, a value obtained by increment to the present value of the Counter 414 of the file B and migration information or stubbing information to the operation log 500.

(6) The Data Mover program 112 adds 1 to a value of a Counter 506 of the management information file 400 of the file B.

According to the processing described above, by storing an operation from the client 600 with respect to a file stored in the file system 130 of the Edge file storage 100 and an operation of the Data Mover program 112 in the operation log 500, when the file and the management information file 400 become inconsistent such as during an occurrence of a power interruption or the like outside of a location, an operation can be detected from the operation log 500 and consistency can be recovered.

Terms will be described below.

Update information of differential data may be stored, for each updated file, in metadata of the file, in a file that differs from the file, or in a database for managing update information of differential data. Update information of differential data includes operation contents, an operation target, and an object address, an offset, and a length of the operation target.

A file state is management information indicating a state of a file stored in the file system 130 of the Edge file storage 100. The file state can take three states: Dirty, Cached, and Stub.

A file partial state (or a file data state or an offset state) is management information indicating a state for each offset of file data stored in the file system 130 of the Edge file storage 100. The file partial state can take the three states of Dirty, Cached, and Stub for each file portion or, in other words, each offset of file data.

The Dirty state represents a state where a file or an offset of file data is not reflected on a data center 20.

The Cached state represents a state where a file or an offset of file data is reflected on the data center 20 and, at the same time, the file data is stored in the file system 130 of the Edge file storage 100.

The Stub state represents a state where a file or an offset of file data is reflected on the data center 20 and, at the same time, the file data is not stored in the file system 130 of the Edge file storage 100.

A storage location of the file state and the file partial state may be metadata of each file, a file that differs from the file, or a database for managing the file state and the file partial state.

Figure 2:
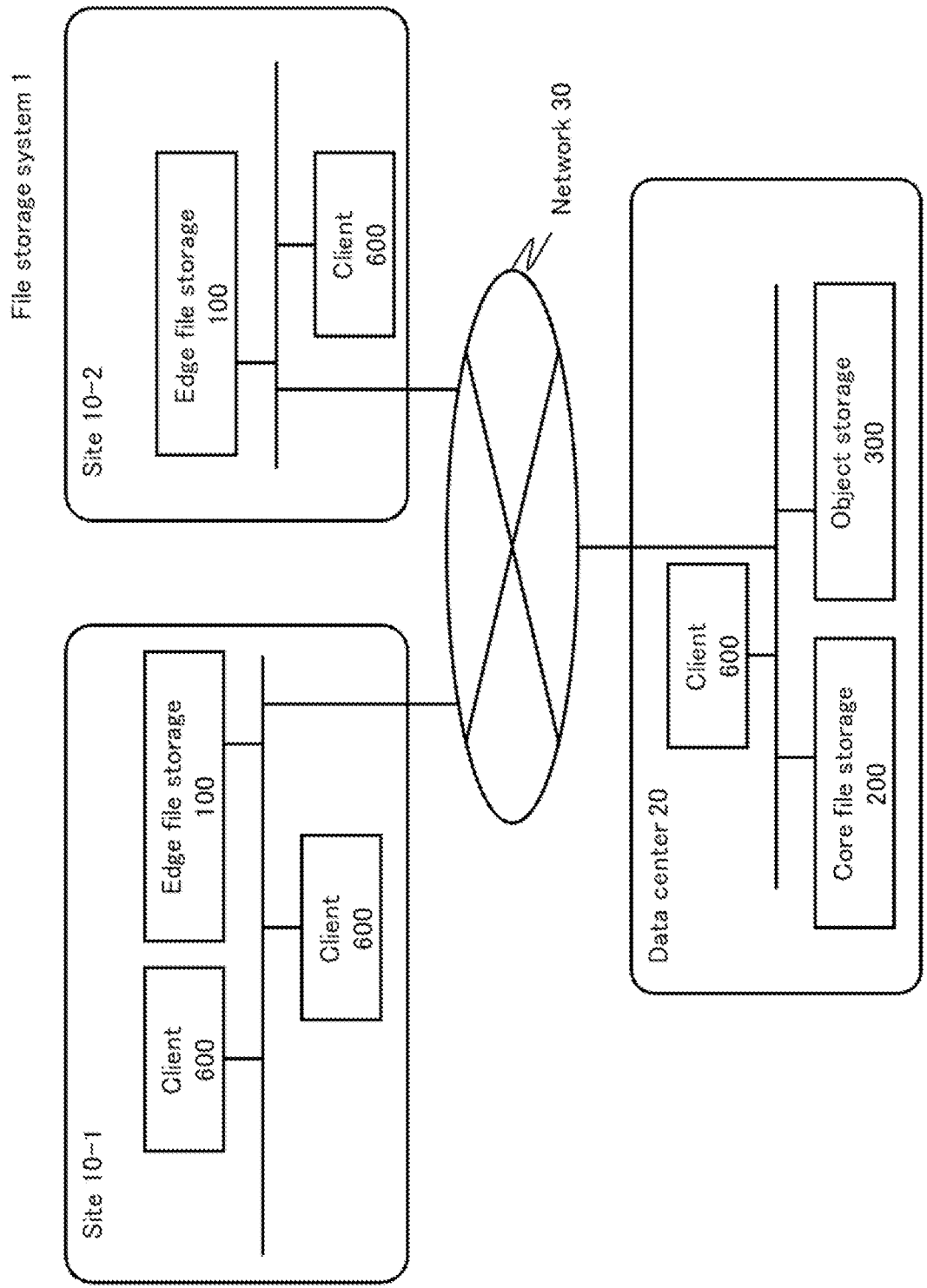
FIG. 2 represents an example of a configuration diagram of the file storage system according to the embodiment.

FIG. 2 represents an example of a configuration diagram of the file storage system according to the present embodiment.

A file storage system 1 has respective sites 10-1 and 10-2, the data center 20, and a network 30 that couples the sites 10-1 and 10-2 and the data center 20 to each other. One or a plurality of clients 600 and one or a plurality of Edge file storages 100 are arranged at the sites 10-1 and 10-2. The data center 20 has one or a plurality of clients 600, one or a plurality of Core file storages 200, and one or a plurality of object storages 300.

At the respective sites 10-1 and 10-2, the client 600 and the Edge file storage 100 are coupled by, for example, a network such as an intra-base LAN (Local Area Network). The client 600 uses the file sharing service provided by the Edge file storage 100 using, for example, a file sharing protocol such as NFS (Network File System) and CIFS (Common Internet File System).

At the data center 20, the client 600, the Core file storage 200, and the object storage 300 are coupled by, for example, a network such as an intra-base LAN (Local Area Network).

The network 30 that couples the respective sites to each other is, for example, a WAN (Wide Area Network), and each Edge file storage 100 accesses the Core file storage 200 using, for example, a protocol such as HTTP (Hypertext Transfer Protocol).

While the present embodiment is described by presenting an example where two sites 10-1 and 10-2 are provided inside a computer system, the computer system may include any number of sites.

It should be noted that the types of networks are not limited to the networks described above and various networks can be used.

Figure 3:
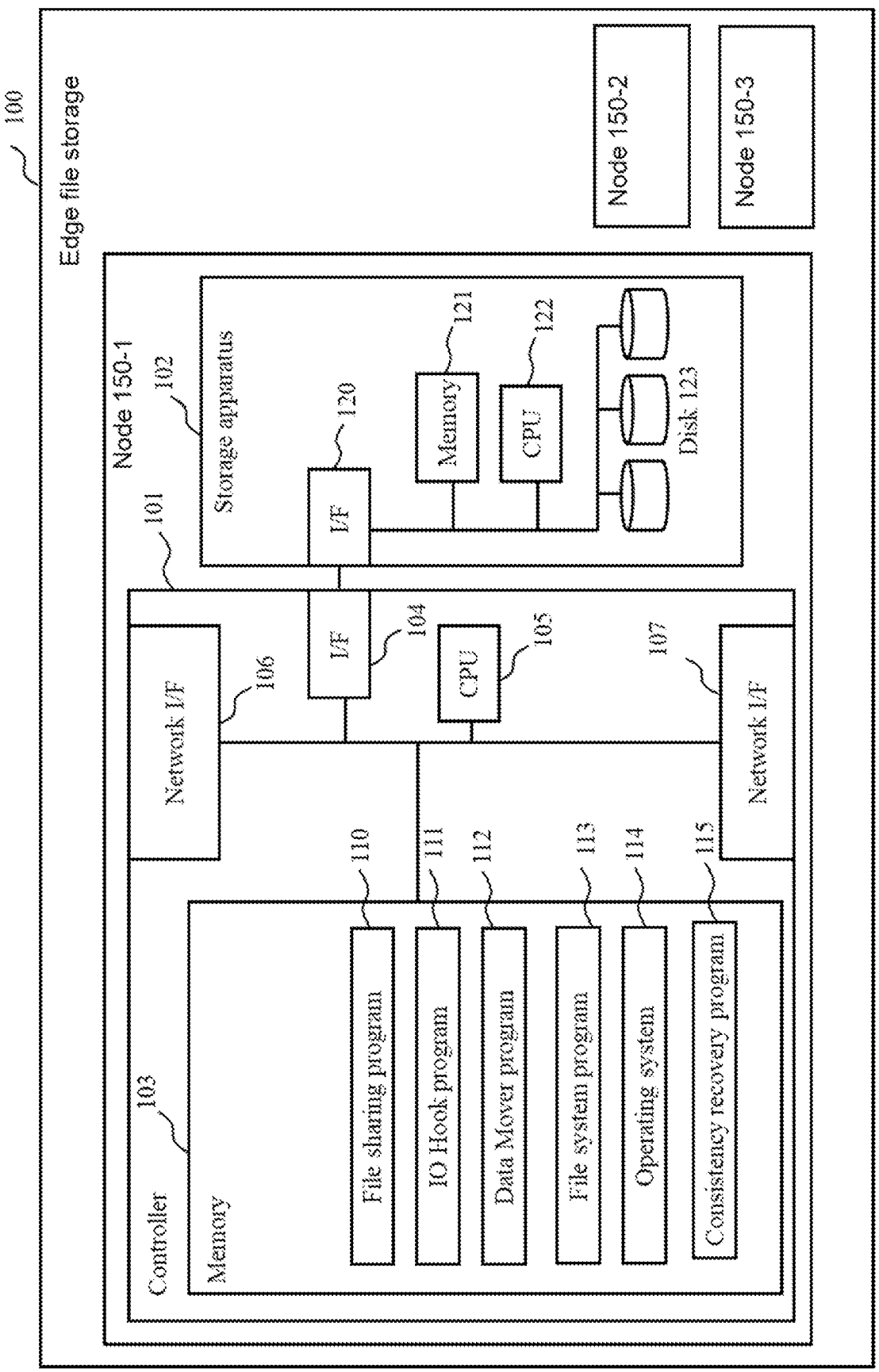
FIG. 3 is a configuration diagram of an Edge file storage related to the file storage system according to the embodiment.

FIG. 3 is a configuration diagram of the Edge file storage 100.

The Edge file storage 100 is constituted by one or a plurality of nodes 150. While the Edge file storage 100 shown in FIG. 3 represents an example of three nodes, namely, a node 150-1, a node 150-2, and a node 150-3, the Edge file storage 100 may be constituted by any number of nodes.

The node 150 has a controller 101 and a storage apparatus 102. The controller 101 has a memory 103, a CPU 105, network interfaces (I/Fs) 106 and 107, and an interface 104. These components are mutually coupled by, for example, a communication path such as a bus.

The CPU 105 executes a program stored in the memory 103. The network I/F 106 is an interface for communicating with the client 600 via an intra-site network. The network I/F 107 is an interface for communicating with the data center 20 via the network 30. The I/F 104 is an interface to be coupled to an I/F 120 in order to mutually communicate with the storage apparatus 102. The I/F that couples the plurality of nodes 150 inside the Edge file storage 100 to each other may double as the network I/F 106, may double as the network I/F 107, or may be an I/F of an internal network that is independent of these networks.

The memory 103 stores programs and information for controlling the Edge file storage 100. Specifically, for example, the memory 103 stores a file sharing program 110, the IO Hook program 111, the Data Mover program 112, a file system program 113, a consistency recovery program 115, and an operating system (OS) 114. It should be noted that the respective programs and information stored in the memory 103 may be stored in the storage apparatus 102. In this case, the programs are to be read by the CPU 105 to the memory 103 and executed by the CPU 105.

The file sharing program 110 is a program for providing an interface using a file sharing protocol between the client 600. The IO Hook program 111 is a program for detecting a file and a directory stored in the file system 130 via the file sharing program 110. The Data Mover program 112 is a program for transferring the file and the directory detected by the IO Hook program 111 to the Core file storage 200. The consistency recovery program 115 is a program for executing consistency recovery processing when an inconsistency occurs in a state or a partial state of a file due to a failure such as power interruption. The file system program 113 is a program for controlling the file system 130.

The storage apparatus 102 has a memory 121, a CPU 122, and the I/F 120. These components are mutually coupled by, for example, a communication path such as a bus. The I/F 120 is an interface to be used for coupling to the controller 101. The memory 121 and a disk 123 store programs and data. The CPU 122 executes the program in the memory 121 based on a command from the controller 101. The storage apparatus 102 may provide the controller 101 with a block-format storage function such as FC-SAN (Fibre Channel Storage Area Network).

Since a configuration of the Core file storage 200 is the same as that of the Edge file storage 100, the Core file storage 200 will be illustrated and described in a simplified manner.

Figure 4:
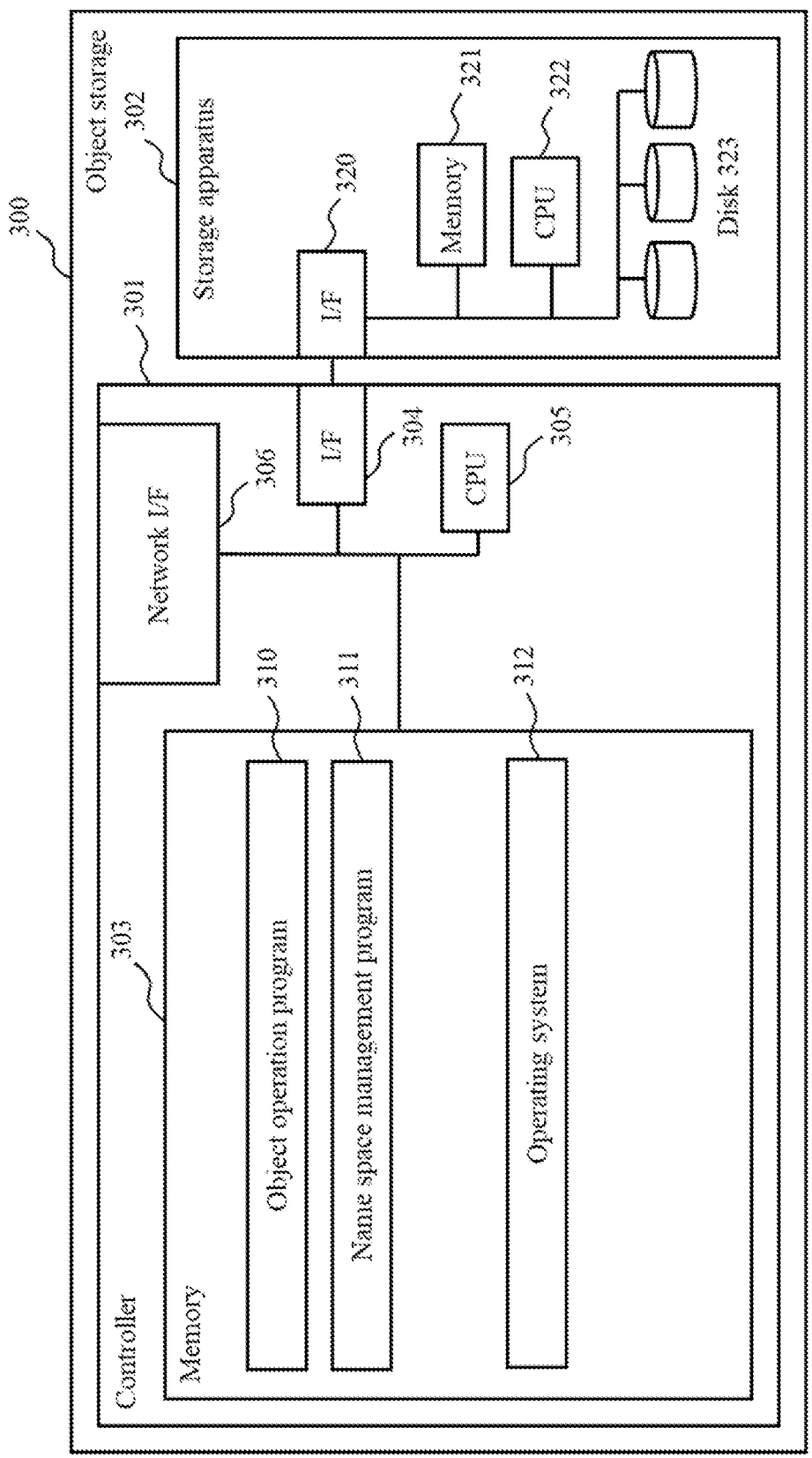
FIG. 4 is a configuration diagram of an object storage related to the file storage system according to the embodiment.

FIG. 4 is a configuration diagram of the object storage 300.

The object storage 300 has a controller 301 and a storage apparatus 302. The controller 301 has a memory 303, a CPU 305, a network I/F 306, and an I/F 304. These components are mutually coupled by, for example, a communication path such as a bus.

The CPU 305 executes a program stored in the memory 303. The network I/F 306 is an interface for communicating with the Core file storage 200 via a network inside the data center 20. The I/F 304 is an interface to be coupled to an I/F 320 in order to communicate with the storage apparatus 302.

The memory 303 stores programs and information for controlling the object storage 300. Specifically, for example, the memory 303 stores an object operation program 310, a name space management program 311, and an operating system (OS) 312. It should be noted that the respective programs and information stored in the memory 303 may be stored in the storage apparatus 302. In this case, the programs are to be read by the CPU 305 to the memory 303 and executed by the CPU 305.

The object operation program 310 is a program for processing a request (for example, a PUT request or a GET request) from the Core file storage 200. The name space management program 311 is a program for creating and managing a name space.

The storage apparatus 302 has a memory 321, a CPU 322, a disk 323, and the I/F 320. These components are mutually coupled by, for example, a communication path such as a bus. The I/F 320 is an interface to be used for coupling to the controller 301. The memory 321 and the disk 323 store programs and data. The CPU 322 executes the program in the memory 321 based on a command from the controller 301. The storage apparatus 302 may provide the controller 301 with a block-format storage function such as FC-SAN.

Figure 5:
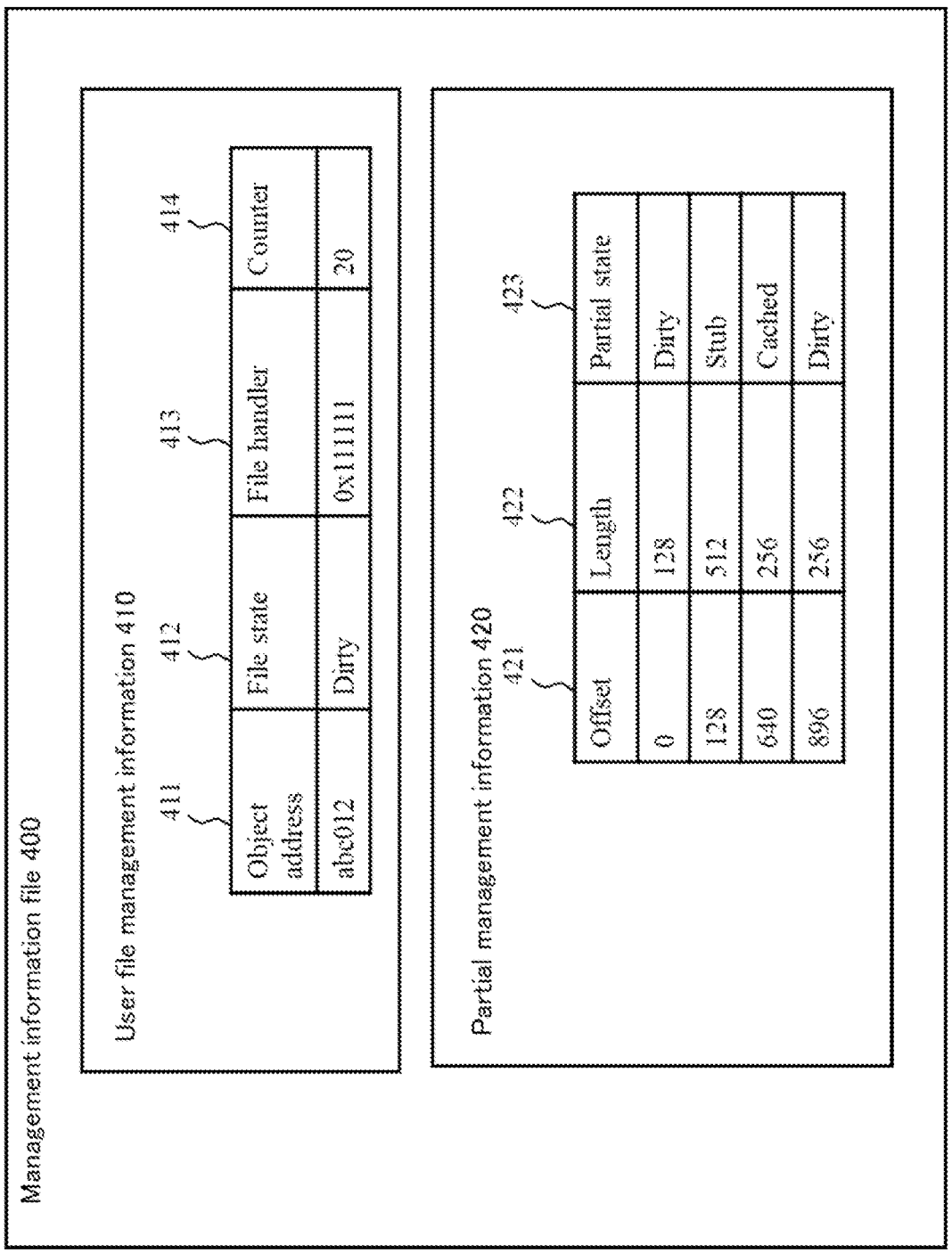
FIG. 5 represents an example of a management information file 400 related to the file storage system according to the embodiment.

FIG. 5 represents an example of the management information file 400.

The management information file 400 is generated in association with each user file stored in the Edge file storage 100. The management information file 400 has user file management information 410 and partial management information 420.

The user file management information 410 has an entry for each object address 411. Each entry includes the object address 411 that is added to a user file, a file state 412 of the user file, a file handler 413 of the user file, and a Counter 414.

The object address 411 is an address on the object storage 300 in which the user file corresponding to the management information file 400 is stored. The file state 412 indicates a state of the user file and is one of Dirty, Cached, and Stub. The Counter 414 indicates the number of times the file had been migrated or stubbed by the Data Mover program 112. Every time the Data Mover program 112 migrates or stubs a file, the Data Mover program 112 increments the Counter 414 held inside the management information file 400 that corresponds to the file.

The partial management information 420 has an offset 421, a length 422, and a partial state 423. The offset 421 indicates, when a user file is subjected to partial update processing, a start position of the update processing, the length 422 indicates a data length having been subjected to update processing from a position of the offset 421, and the partial state 423 indicates a state of the portion and is any of Dirty, Stub, and Cached.

FIG. 6 represents an example of the operation log 500.

As already described, the operation log 500 is provided for each node 150. The operation log 500 records an operation type 501, a file handler 502, a type 503, an Offset 504, a Length 505, a Counter 506, and a Timestamp 507.

Examples of the operation type 501 include creation, update, metadata update, replication, and stubbing. The file handler 502 is a file handler of a main body of an operation target file. The type 503 is a value indicating whether an object to be an operation target is a file or a directory.

The Offset 504 represents a start offset of a target range in the file of the operation. The Length 505 represents a size of a target operation.

The Counter 506 indicates the number of times the file had been migrated or stubbed by the Data Mover program 112 after being generated. When the operation is performed by the IO Hook program 111 such as when the operation type is generation, update, reference, metadata update, and metadata reference, a value of the Counter 414 of the management information file 400 is stored, but when the operation is performed by the Data Mover program 112 such as when the operation type is migration and stubbing, a value obtained by increment to the value of the Counter 414 of the management information file 400 is stored. The timestamp 507 represents a time point at which the operation had been executed.

Next, processing of the file storage system 1 according to the present embodiment will be described with reference to the flow charts in FIGS. 7 to 13.

Figure 7:
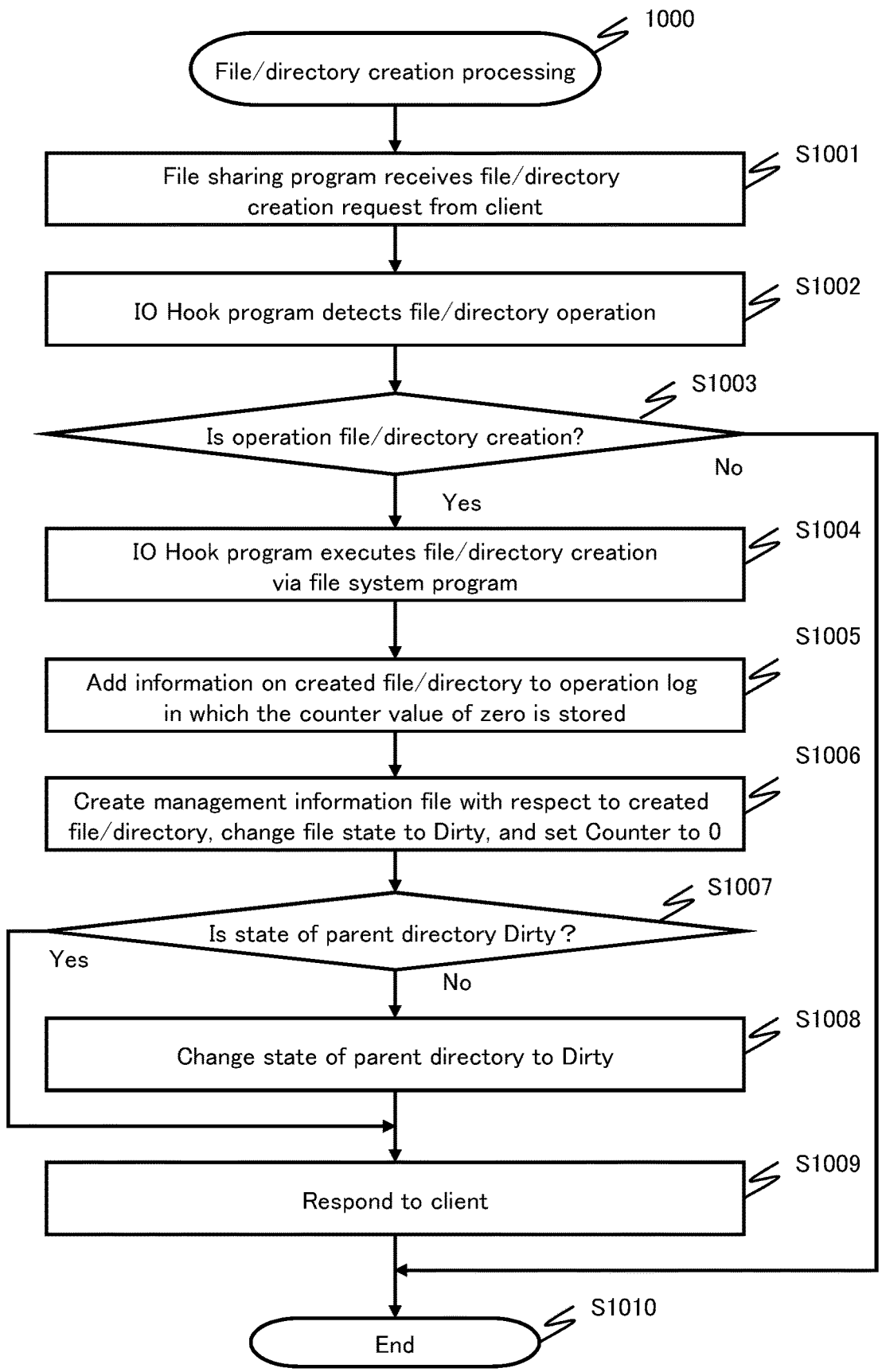
FIG. 7 represents an example of a flow chart of file/directory creation processing in the file storage system according to the embodiment.

FIG. 7 represents an example of a flow chart of file/directory creation processing 1000. The file/directory creation processing 1000 is performed in each Edge file storage 100 when the CPU 105 of the controller 101 executes the file sharing program 110 and the IO Hook program 111.

The file sharing program 110 receives a file/directory creation request from the client 600 (S1001).

The IO Hook program 111 detects a file/directory operation received by the file sharing program 110 (S1002).

The IO Hook program 111 determines whether or not the operation detected in S1002 is file/directory creation (S1003).

When the operation detected in S1002 is not file/directory creation (S1003: No), the file/directory creation processing 1000 is ended (S1010).

On the other hand, when the operation detected in S1002 is file/directory creation (S1003: Yes), the IO Hook program 111 requests the file system program 113 to perform file/directory creation and the file system program 113 creates a file/directory in the file system 130.

In the present step, in accordance with a file type of the target file of the operation detected in S1002, the IO Hook program 111 requests the file system program 113 to perform file creation when the file type is an ordinary file and requests the file system program 113 to perform directory creation when the file type is a directory.

The file system program 113 creates a file/directory based on the requested file type (S1004). The IO Hook program 111 adds information on the created file/directory to the operation log 500. At this point, zero is stored in the Counter 506 (S1005).

The IO Hook program 111 sets the state of the created file/directory to Dirty and stores zero that is an initial value in the Counter 414 (S1006). A method of managing the state of the file/directory may be any method such as storing the state in metadata of the file, storing the state in a file that differs from the created file/directory (the present embodiment), or storing the state in a database.

The IO Hook program 111 determines a state of a parent directory of the created file/directory (S1007).

When the state of the parent directory of the created file/directory is not Dirty (step S1007: No), the IO Hook program 111 updates the state of the parent directory to Dirty (S1008).

On the other hand, when the state of the parent directory of the created file/directory is Dirty (step S1007: Yes), a transition is made to S1009.

The file sharing program 110 responds to the client 600 with file/directory creation completion (S1009) and ends the file/directory creation processing 1000 (S1010).

Due to the file/directory creation processing 1000, information on the created file/directory is stored in the operation log 500, the state of the created file/directory and the state of the parent directory of the created file/directory are set to Dirty, and a file/directory updated after previous migration processing can be identified.

Figure 8:
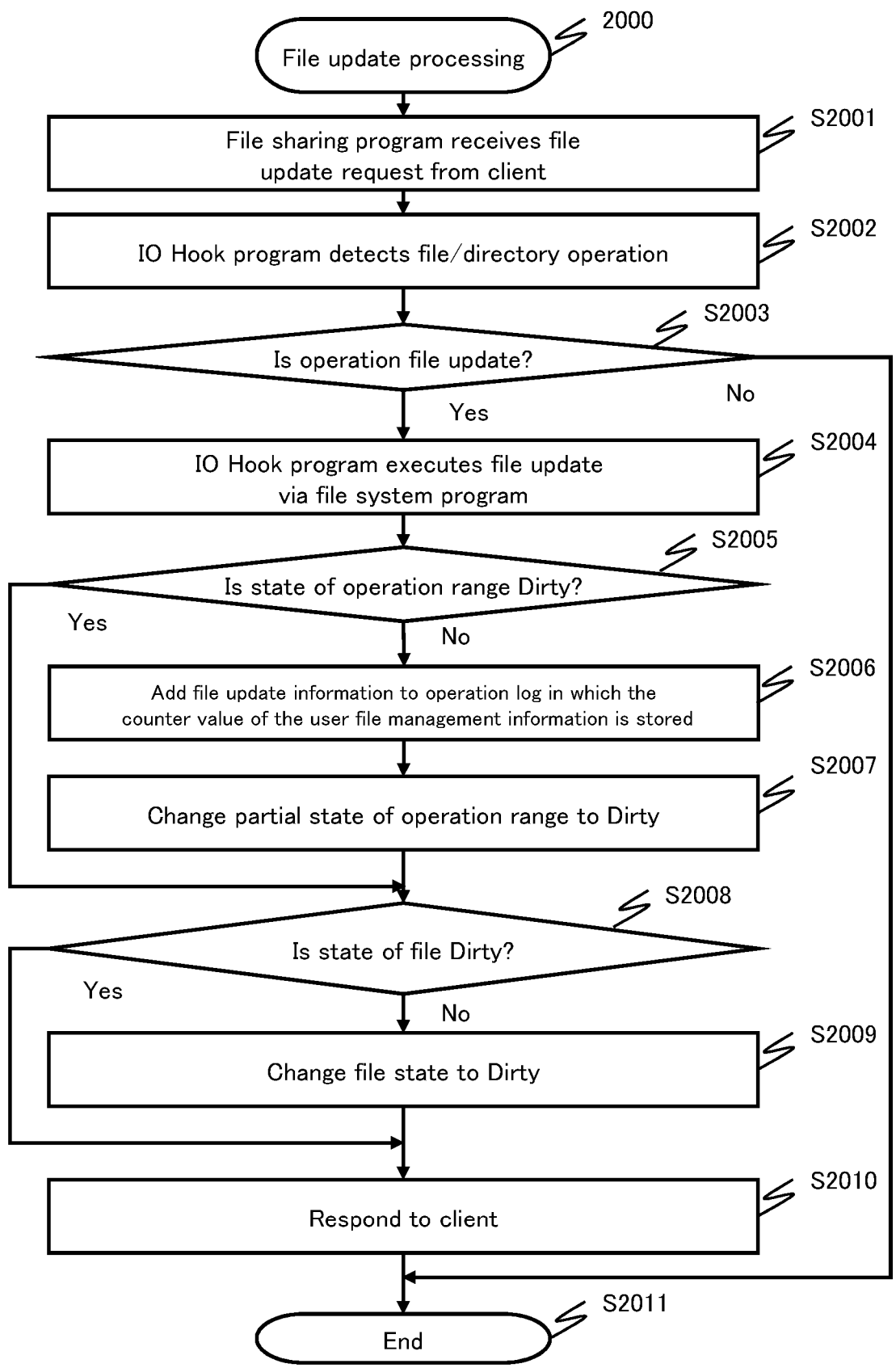
FIG. 8 represents an example of a flow chart of file update processing in the file storage system according to the embodiment.

FIG. 8 represents an example of a flow chart of file update processing 2000. The file update processing 2000 is performed in each Edge file storage 100 when the CPU 105 of the controller 101 executes the file sharing program 110 and the IO Hook program 111.

The file sharing program 110 receives a file update request from the client 600 (S2001). Specifically, the file update includes updating and adding file data by a Write operation, extending and truncating file data by a Truncate operation, changing an owner/group or an access right of a file, and updating metadata such as updating and adding an extended attribute.

The IO Hook program 111 detects a file/directory operation received by the file sharing program 110 (S2002).

The IO Hook program 111 determines whether or not the operation detected in S1002 is file update (S2003).

When the operation detected in S2002 is not file update (S2003: No), the file update processing 2000 is ended (S2011).

On the other hand, when the operation detected in S2002 is file update (S2003: Yes), the IO Hook program 111 requests the file system program 113 to perform file update and the file system program 113 updates a relevant file in the file system 130.

In the present step, in accordance with the operation of file update detected in S2002, the IO Hook program 111 requests the file system program 113 to perform a Write operation or a Truncate operation when the operation is data update and requests the file system program 113 to perform a metadata update operation when the operation is metadata update. The file system program 113 updates the file based on the requested file operation.

The IO Hook program 111 confirms the file partial state of an update range of the updated file and determines whether or not the file partial state is Dirty (S2005).

When the file partial state of the update range of file data of the updated file is not Dirty (step S2005: No), the IO Hook program 111 adds update information of the file to the operation log 500. At this point, the Counter 414 of the user file management information 410 is stored in the Counter 506 (S2006).

The IO Hook program 111 changes the file partial state of the update range to Dirty (S2007). At this point, the value of the Counter 414 of the user file management information 410 is not changed.

A method of managing the state of each range of file data may be any method such as storing the state in metadata of the file, storing the state in a management file that differs from the operation target file (the present embodiment), or storing the state in a database. In the present step, when an operation range of a portion is not Dirty but another operation range is Dirty, only the portion that is not Dirty is changed to Dirty.

On the other hand, when the file partial state of the update range of file data of the updated file is Dirty (step S2005: Yes), a transition is made to S2008.

The IO Hook program 111 confirms the state of the updated file and determines whether or not the state is Dirty (S2008).

When the state of the updated file is not Dirty (step S2008: No), the IO Hook program 111 changes the state of the file to Dirty (S2009).

On the other hand, when the state of the updated file is Dirty (step S2008: Yes), a transition is made to S2010.

The file sharing program 110 responds to the client 600 with file update completion (S2010) and ends the file update processing 2000 (S2011).

Due to the file update processing 2000, information on the updated file is stored in the operation log 500, the state of the range of the file data of the updated file and the state of the file are set to Dirty, and file data and a file updated after previous migration processing can be identified.

Figure 9:
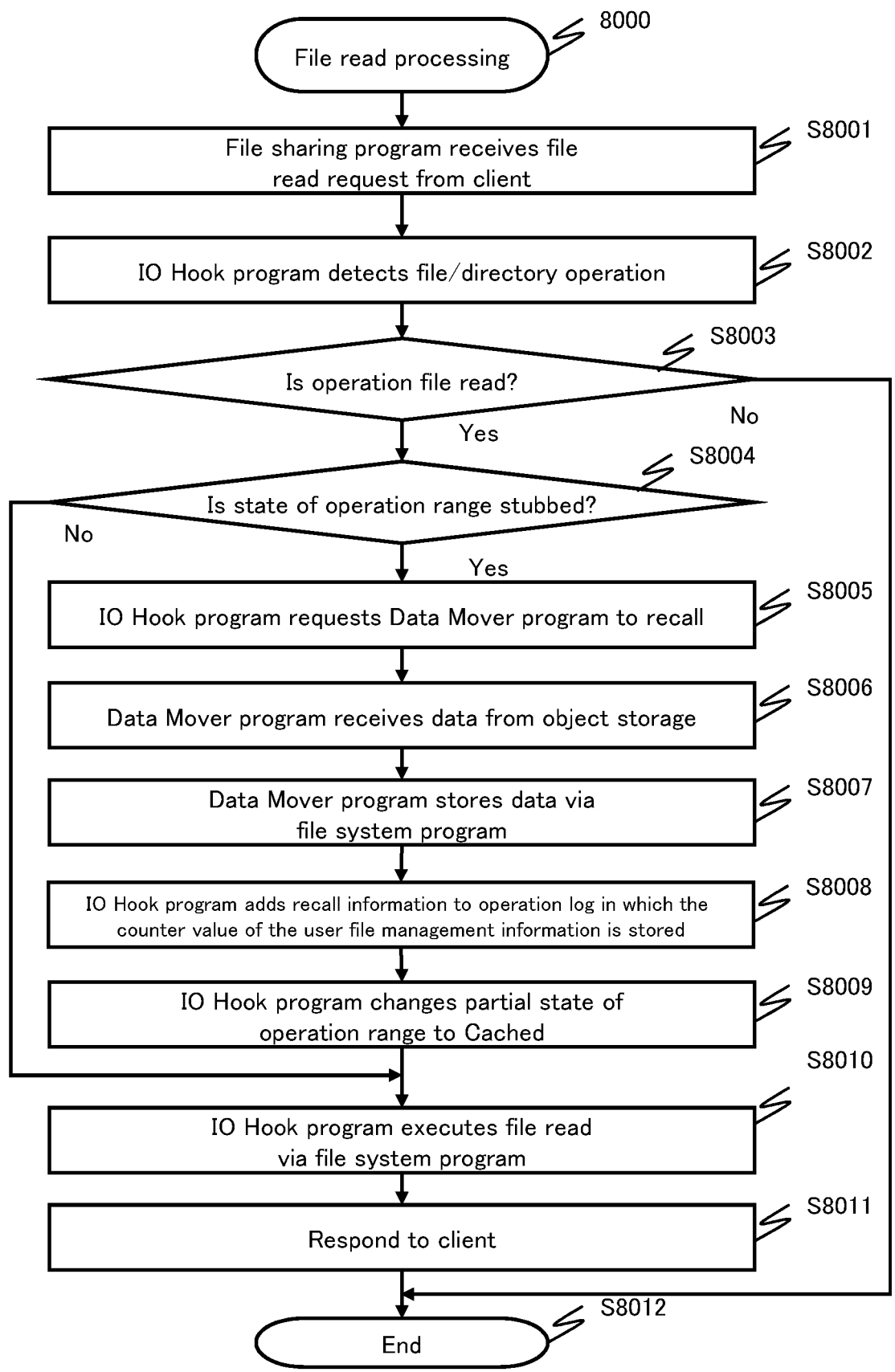
FIG. 9 represents an example of a flow chart of file read processing in the file storage system according to the embodiment.

FIG. 9 represents an example of a flow chart of file read processing 8000. The file read processing 8000 is performed in each Edge file storage 100 when the CPU 105 of the controller 101 executes the file sharing program 110, the IO Hook program 111, and the Data Mover program 112.

The file sharing program 110 receives a file read request from the client 600 (S8001).

The IO Hook program 111 detects a file/directory operation received by the file sharing program 110 (S8002).

The IO Hook program 111 determines whether or not the operation detected in S8002 is file read (S8003).

When the operation detected in S8002 is not file read (S8003: No), the file read processing 8000 is ended (S8012).

On the other hand, when the operation detected in S8002 is file read (S8003: Yes), the IO Hook program 111 determines whether or not a partial state of an operation range is Stub (S8004).

When the partial state of the operation range is Stub (S8004: Yes), a transition is made to S8005, but when the partial state of the operation range is not Stub (S8004: No), a transition is made to S8008. When even one part of the operation range is Stub, a determination of Yes is made in S8004.

When the state of the operation range is Stub, the IO Hook program 111 requests the Data Mover program 112 to issue a recall and the Data Mover program 112 requests data from the Core file storage 200 (S8005). A recall refers to processing for acquiring data from the Core when the data is not stored in the file system 130 of the Edge file storage 100.

The Data Mover program 112 receives data from the object storage 300 (S8006).

The Data Mover program 112 stores the data in the file system 130 via the file system program 113 (S8007).

The IO Hook program 111 adds recall information to the operation log 500. At this point, the Counter 414 of the user file management information 410 is stored in the Counter 506 (S8008).

The IO Hook program 111 changes the partial state of the operation range from Stub to Cached (S8009).

The IO Hook program 111 executes file read via the file system program 113 (S8010).

The IO Hook program 111 sends a response to the client 600 (S8011) and ends the file read processing 8000 (S8012).

Figure 10:
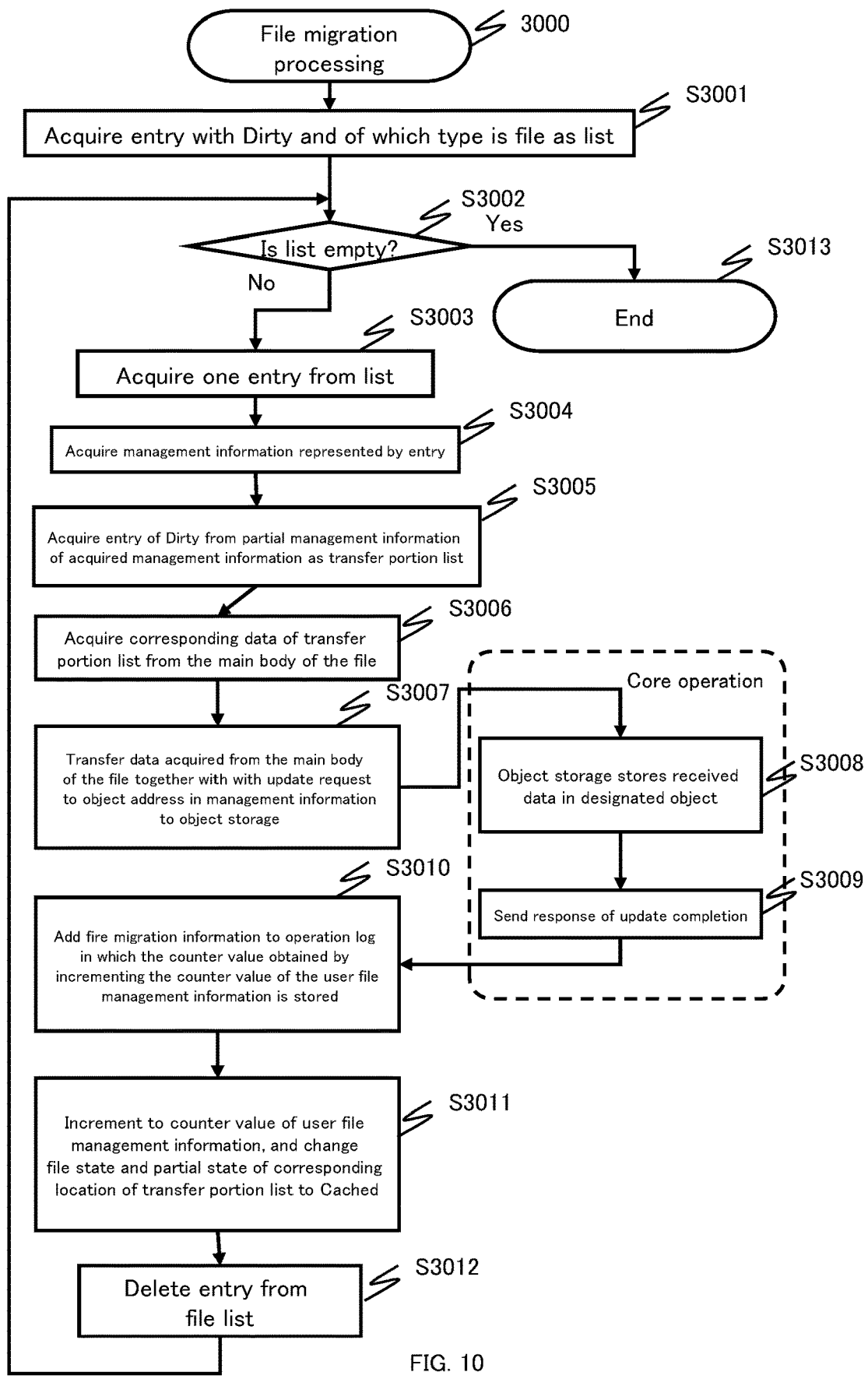
FIG. 10 represents an example of a flow chart of file migration processing in the file storage system according to the embodiment.

FIG. 10 represents an example of a flow chart of file migration processing 3000. The file migration processing 3000 is performed in each Edge file storage 100 when the CPU 105 of the controller 101 executes the Data Mover program 112.

It should be noted that the file migration processing 3000 may be performed when a prescribed condition is satisfied. For example, the file migration processing 3000 may be performed on a regular or irregular basis or executed when the client 600 performs an operation with respect to the file system 130. In addition, the file migration processing 3000 and the directory migration processing may be executed in order or executed simultaneously.

The Data Mover program 112 acquires files that satisfy a condition that a file state is Dirty and a file type is a file from the files/directories stored in the file system 130 and creates a list of the files (S3001).

A method of acquiring files satisfying the condition in the present step may be any method including a method of crawling the file system 130, a method of extracting the files from an operation log that records operations of the file system (the present embodiment), and a method of extracting the files from a database that manages file system operation information.

The Data Mover program 112 determines whether or not the list created in S3001 is empty (step S3002).

When the list is empty (step S3002: Yes), the Data Mover program 112 ends the file migration processing 3000 (S3013).

On the other hand, when the list is not empty (step S3002: No), the Data Mover program 112 acquires an entry from the list (S3003).

The Data Mover program 112 acquires management information of the entry. A storage location of the management information may be an extended attribute of the file, a management file (the present embodiment), or a database.

The Data Mover program 112 acquires, as a transfer portion list, an entry of which the state of file data is Dirty based on the management information acquired in S3004 (S3005).

The Data Mover program 112 acquires a location recorded in the transfer portion list acquired in S3005 from a main body file via the file system program 113 (S3006).

The Data Mover program 112 acquires an object address from the management information and issues an update request with respect to the object address. At this point, the file data acquired in S3006 is transferred (S3007).

The object storage 300 receives the request from the Edge file storage 100 and stores the received data with respect to the designated object address (S3008).

The object storage 300 sends a response to the Edge file storage 100 (S3009).

The Data Mover program 112 adds file migration information to the operation log 500 (S3010). At this point, a value obtained by increment to the value of the Counter 414 of the user file management information 410 is stored in the Counter 506.

The Data Mover program 112 changes the file state of the file having been transferred to the Core and the partial state of the file data of the transferred portion to Cached and adds 1 to the value of the Counter 414 of the user file management information 410 (S3011).

The Data Mover program 112 deletes the entry of the transferred file from the list created in S3001 and makes a transition to S3002 (S3012).

Figure 11:
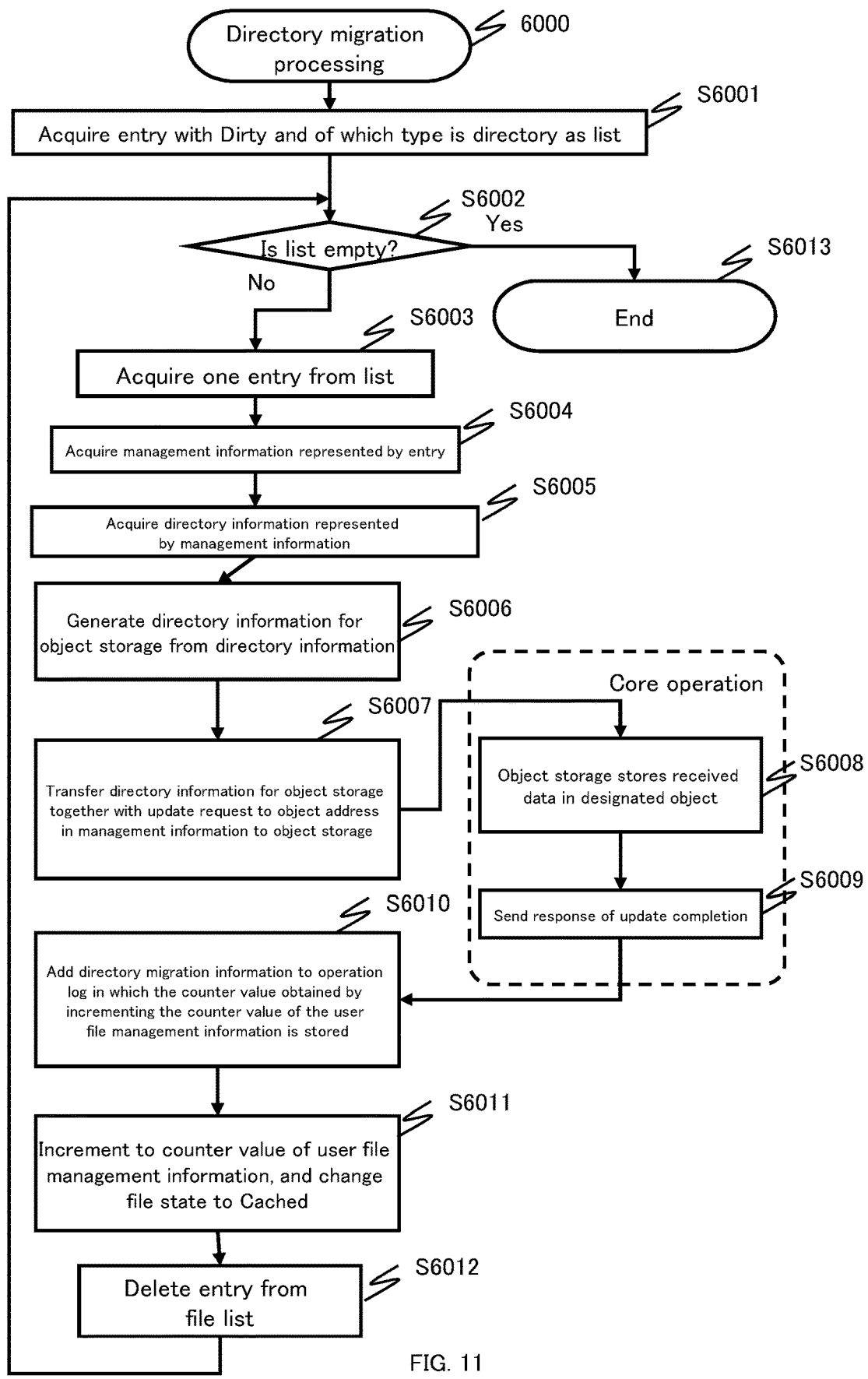
FIG. 11 represents an example of a flow chart of directory migration processing in the file storage system according to the embodiment.

FIG. 11 represents an example of a flow chart of directory migration processing 6000. The directory migration processing 6000 is performed in each Edge file storage 100 when the CPU 105 of the controller 101 executes the Data Mover program 112.

It should be noted that the directory migration processing 6000 may be performed when a prescribed condition is satisfied. For example, the directory migration processing 6000 may be performed on a regular or irregular basis or executed when the client 600 performs an operation with respect to the file system 130. In addition, the file migration processing 3000 and the directory migration processing may be executed in order or executed simultaneously.

The Data Mover program 112 acquires files that satisfy a condition that a file state is Dirty and a file type is a directory from the files/directories stored in the file system 130 and creates a list of the files (S6001).

A method of acquiring files satisfying the condition in the present step may be any method including a method of crawling the file system 130, a method of extracting the files from an operation log that records operations of the file system (the present embodiment), and a method of extracting the files from a database that manages file system operation information.

The Data Mover program 112 determines whether or not the list created in S6001 is empty (step S6002).

When the list is empty (step S6002: Yes), the Data Mover program 112 ends the directory migration processing 6000 (S6013).

On the other hand, when the list is not empty (step S6002: No), the Data Mover program 112 acquires an entry from the list (S6003).

The Data Mover program 112 acquires management information of the entry (S6004). A storage location of the management information may be an extended attribute of the file, a management file (the present embodiment), or a database.

The Data Mover program 112 acquires directory information from the management information acquired in S6004 (S6005). The directory information includes metadata of the directory and directory entry information of the directory. The directory entry information includes names and object addresses of files/directories under the directory.

The Data Mover program 112 generates directory information for object storage from the directory information acquired in S6005 (S6006).

The Data Mover program 112 acquires an object address from the management information and issues an update request with respect to the object address. At this point, the directory information for object storage generated in S6006 is transferred (S6007).

The object storage 300 receives the request from the Edge file storage 100 and stores (updates) the received data with respect to the designated object address (S6008).

The object storage 300 sends a response to the Edge file storage 100 (S6009).

The Data Mover program 112 adds directory migration information to the operation log 500 (S6010). At this point, a value obtained by increment to the value of the Counter 414 of the user file management information 410 is stored in the Counter 506.

The Data Mover program 112 changes the file state of the directory having been transferred to the Core to Cached and adds 1 to the value of the Counter 414 of the user file management information 410 (S6011).

The Data Mover program 112 deletes the entry of the transferred directory from the list created in S6001 and makes a transition to S6002 (S6012).

Figure 12:
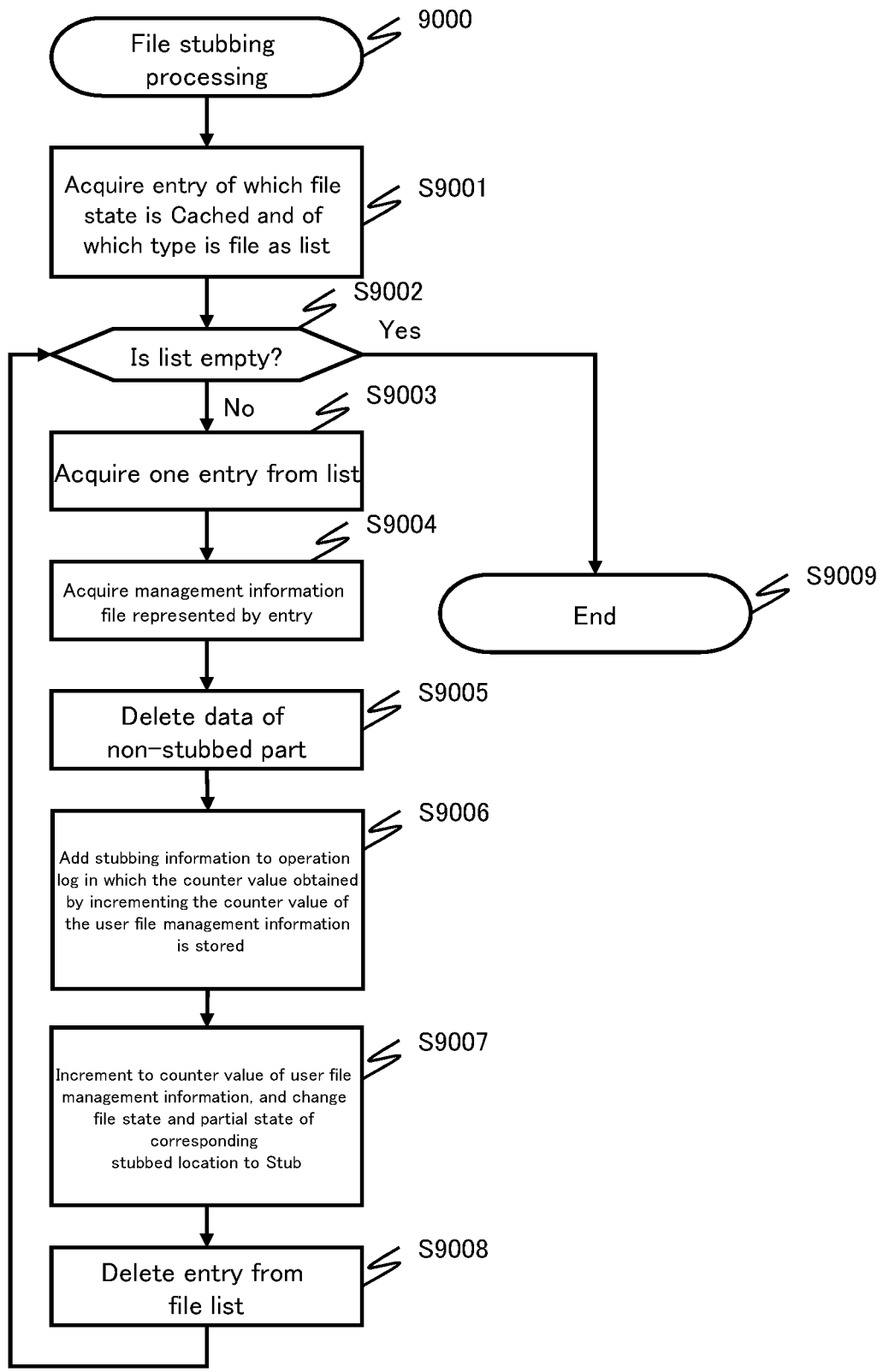
FIG. 12 represents an example of a flow chart of file stubbing processing in the file storage system according to the embodiment.

FIG. 12 represents an example of a flow chart of file stubbing processing 9000. The file stubbing processing 9000 is processing for deleting data of a file of which the file state 412 is Cached and changing the file state 412 to Stub among files having already been migrated to the object storage 300.

The file stubbing processing 9000 is performed in each Edge file storage 100 when the CPU 105 of the controller 101 executes the Data Mover program 112. It should be noted that the file stubbing processing 9000 may be performed when a prescribed condition is satisfied. For example, the file stubbing processing 9000 may be performed on a regular or irregular basis or executed when the client 600 performs an operation with respect to the file system 130. In addition, the file stubbing processing 9000 may be executed in order with the file migration processing 3000 and the directory migration processing 6000 or executed simultaneously.

When the file stubbing processing starts (step S9000), the Data Mover program 112 acquires an entry of which the file state 412 is Cached and the type is a file as a list (step S9001).

A method of acquiring files satisfying the condition in the present step may be any method including a method of crawling the file system 130, a method of extracting the files from an operation log that records operations of the file system, and a method of extracting the files from a database that manages file system operation information.

Next, the Data Mover program 112 determines whether or not the file list acquired in step S9001 is empty (step S9002). As a result, when a positive determination is made (Yes in step S9002), the program migrates to step S9009, but when a negative determination is made (No in step S9002), the program migrates to step S9003.

In step S9003, the Data Mover program 112 acquires an entry from the list acquired in step S9001. Next, the Data Mover program 112 acquires the management information file 400 indicated by the entry acquired in step S9003 (step S9004). Next, the Data Mover program 112 acquires a user file indicated by the management information file 400 acquired in step S9004 (step S9005).

The Data Mover program 112 adds stubbing information to the operation log 500 (S9006). At this point, a value obtained by increment to the value of the Counter 414 of the user file management information 410 is stored in the Counter 506.

The Data Mover program 112 changes the file state 412 of the stubbed file from Cached to Stub, changes the partial state 423 of a range of which data has been deleted from Cached to Stub, and adds 1 to the value of the Counter 414 of the user file management information 410 (S9007).

The Data Mover program 112 deletes the entry from the file list acquired in step S9001 (step S9008).

Figure 13:
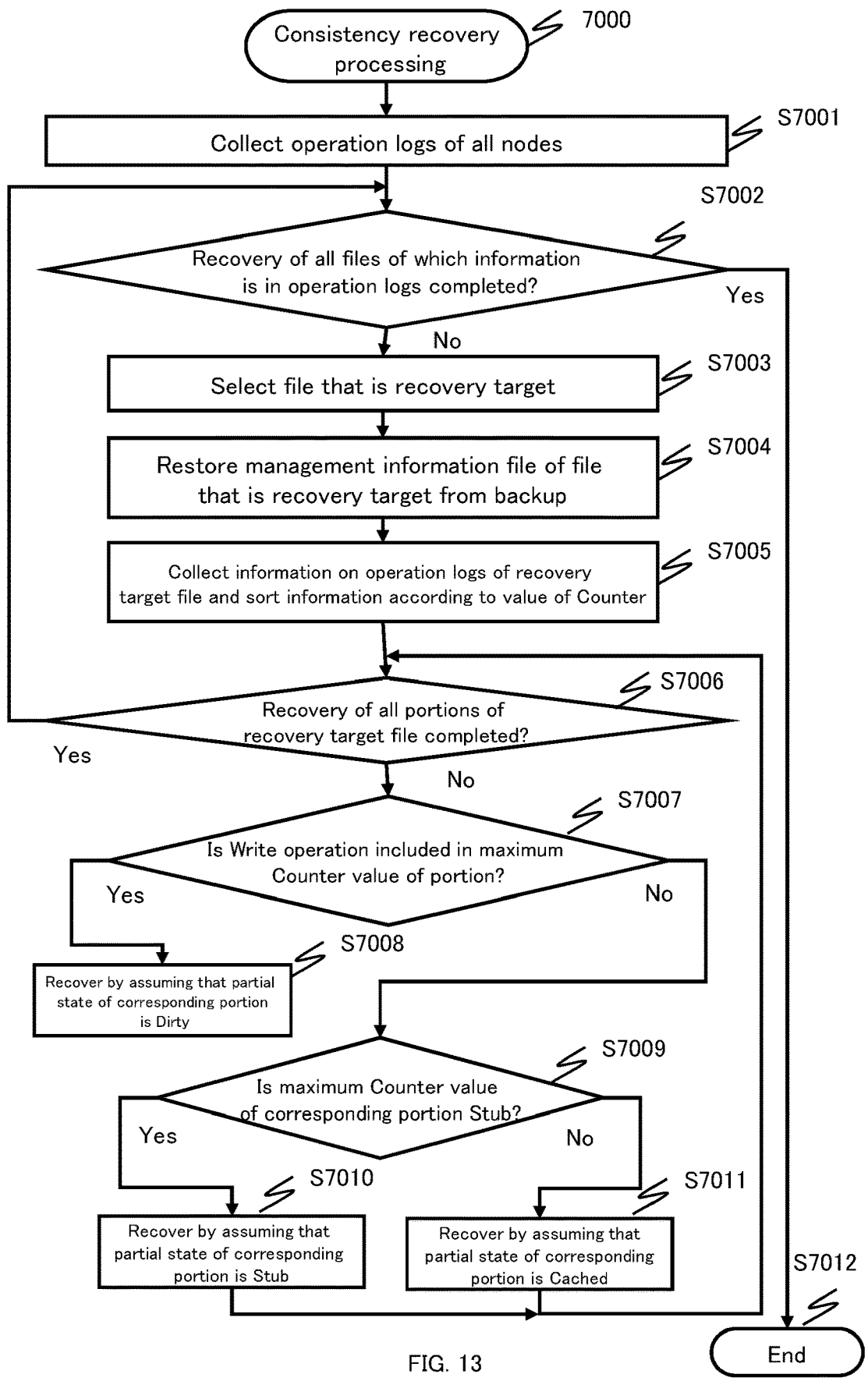
FIG. 13 represents an example of a flow chart of consistency recovery processing in the file storage system according to the embodiment.

FIG. 13 shows an example of a flow chart of consistency recovery processing 7000. The consistency recovery processing 7000 is processing for referring to the operation log 500 and recovering consistency with respect to a file that is not consistent. The consistency recovery processing 7000 is performed in each Edge file storage 100 when the CPU 105 of the controller 101 executes the consistency recovery program 115.

It should be noted that the consistency recovery processing 7000 may be performed when a prescribed condition is satisfied. For example, the consistency recovery processing 7000 may be performed after the node 150 starts up following a recovery from a failure such as power interruption. Alternatively, the consistency recovery processing 7000 may be performed on a regular or irregular basis or executed when the client 600 performs an operation with respect to the file system 130.

The consistency recovery program 115 collects operation logs 500 of all nodes 150 (S7001).

The consistency recovery program 115 determines whether or not consistency recovery of all files of which information is stored in the operation logs 500 is completed (S7002).

When consistency recovery of all files of which information is stored in the operation logs 500 is completed (S7002: Yes), the consistency recovery processing is ended (S7012).

On the other hand, when consistency recovery of all files of which information is stored in the operation logs 500 is not completed (S7002: No), a recovery target file is selected (S7003).

The consistency recovery program 115 restores the management information file 400 of the file that is the recovery target from backup (S7004). The present embodiment assumes that the management information file 400 is also transferred to the object storage 300 as a migration target and, in S7004, the management information file 400 is restored from the object storage 300. However, backup is not limited to this backup method and another mechanism for backup may be used.

The consistency recovery program 115 collects operation logs 500 of the recovery target file and sorts the operation logs 500 according to values of the Counter 506 (S7005).

The consistency recovery program 115 determines whether or not recovery of all portions is completed with respect to the recovery target file (S7006).

When recovery of all portions is completed with respect to the recovery target file (S7006: Yes), a transition is made to S7002.

On the other hand, when recovery of all portions is not completed with respect to the recovery target file (S7006: No), the consistency recovery program 115 determines whether or not a Write operation is included in a largest value of the Counter 506 of the portions (S7007).

When a Write operation is included in the largest value of the Counter 506 of the portions (S7007: Yes), the consistency recovery program 115 sets Dirty to the partial state 423 of the portion (S7008).

On the other hand, when a Write operation is not included in the largest value of the Counter 506 of the portions (S7007: No), the consistency recovery program 115 determines whether or not the largest value of the Counter 506 of the portions is Stub (S7009).

When the largest value of the Counter 506 of the portions is Stub (S7009: Yes), the consistency recovery program 115 sets Stub to the partial state 423 of the portion and makes a transition to S7006 (S7010).

When the largest value of the Counter 506 of the portions is not Stub (S7009: No), the consistency recovery program 115 sets Cached to the partial state 423 of the portion and makes a transition to S7007 (S7011).

It should be noted that a simplification can be implemented by not distinguishing Stub and Cached from each other. In this case, Cached is also handled as quasi-Stub. Therefore, even when a change has been made from Cached to Stub due to stubbing, the counter value is not updated. In addition, Stub is assumed in S7009 and processing advances to S7010 in all cases, and recovery is performed on the assumption of Stub even if a failure occurs when the partial state is Cached. Even when performing these steps, since the only difference is that data of a cached file in the Edge file storage 100 is ignored and recall processing for acquiring same data from an object storage is excessively generated, a problem does not occur.

According to the present embodiment configured as described above, consistency of management information of file virtualization in a distributed file system can be guaranteed while preventing a decline in IO performance of a client.

It should be noted that the components of the embodiment presented above have been described in detail to provide a clear understanding of the present invention, and the present invention is not necessarily limited to embodiments that include all of the components described above. Furthermore, a part of the components of the respective embodiments may be added to, deleted from, or replaced with other components.

Moreover, the respective components, functions, processing units, processing means, and the like described above may be partially or entirely realized by hardware by, for example, designing with integrated circuits or the like. In addition, the present invention can also be realized by a program code of software that realizes the functions of the embodiments. In this case, a computer is provided with a storage medium on which the program code is recorded, and a processor included in the computer reads the program code stored in the storage medium. In this case, the program code itself that is read from the storage medium is to realize the functions of the embodiments described above, and the program code itself and the storage medium storing the program code are to constitute the present invention. As the storage medium for supplying such a program code, for example, a flexible disk, a CD-ROM, a DVD-ROM, a hard disk, an SSD (Solid State Drive), an optical disk, a magneto-optical disk, a CD-R, a magnetic tape, a nonvolatile memory card, and a ROM are used.

In addition, the program code that realizes the functions described in the present embodiment can be implemented in a wide range of programs or scripting languages such as assembler, C/C++, perl, Shell, PHP, Java (registered trademark), and Python.

In the embodiment described above, control lines and information lines are those considered necessary for purposes of illustration and do not necessarily represent all control lines and information lines as far as a product is concerned. All of the components may be coupled to each other.

What is claimed is:

1. A file storage system comprising a plurality of nodes having a processor and a storage apparatus, the file storage system comprising a first storage system configured to store a file by a distributed file system and perform input/output of the file for a client and a second storage system to which the file stored in the first storage system is transferred, the file storage system implementing a file virtualization function by the first storage system and the second storage system, wherein the file storage system has a management information file, which includes a counter value indicating a time-series sequence and which is provided for each file, and an operation log in which operation content of the file is described together with the counter value, and the first storage system is configured to:

perform an operation on the file stored in the first storage system on the basis of an operation request with respect to the file, describe, in the operation log, the counter value of the management information file, associated with the file on which the operation is to be performed, together with the operation content with respect to the file, and reply to the operation request; and update the counter value of the management information file when the file stored in the first storage system is transferred to the second storage system wherein when a failure occurs, a relationship among operation content of the operation log, a file stored in the first storage system, and a file stored in the second storage system is identified based on the counter value, and consistency between the file and the management information file is recovered;

wherein when recovering the consistency, the processor is configured to recover the consistency on the assumption that a partial state is Dirty when an update of the file is included in operation content of the file of which counter value is maximum, recover the consistency of the management information file on the assumption that the partial state is Cached when operation content of the file of which counter value is maximum is only migration processing of the file, and recover the consistency of the management information file on the assumption that the partial state is Stub when operation content of the file of which counter value is maximum is only stubbing processing of the file.

2. The file storage system according to claim 1, wherein even when the file is deleted from the first storage system in a state where the file is stored in the second storage system, the counter value of the management information file is updated.

3. The file storage system according to claim 2, wherein the transfer of the file to the second storage system is migration processing in which the file is transferred but retained in the first storage system, the second storage system having received the transfer is configured to either store the transferred file or update the stored file, and a deletion of the file from the first storage system is stubbing processing, and recall processing of transferring the deleted file from the second storage system to the first storage system can be performed.

4. The file storage system according to claim 3, wherein the management information file has a state of the file of the first storage system that corresponds to the file of the second storage system, and when an operation with respect to the file of the first storage system is performed, the state of the file is updated.

5. The file storage system according to claim 1, wherein the counter value of the management information file associated with the file related to the operation is updated when the file is transferred to the second storage system but the counter value is not updated in an operation on the file while being stored in the first storage system.

6. The file storage system according to claim 1, wherein the first storage system is arranged in each of the plurality of nodes, the management information file is arranged in at least any of the plurality of nodes, and the first storage system executing a first step is configured to accept the operation request, acquire the counter value of the management information file of the file to be a target of the operation from any of the nodes, and describe operation content thereof and the counter value in the operation log of the node in which the first storage system itself is arranged.

7. The file storage system according to claim 6, wherein the state of the file is a partial state of each portion of the file, and the partial state of the file includes Dirty indicating that the file after an operation is not reflected on the second storage system, Cached indicating that the file after the operation is reflected on the second storage system and, at the same time, the file is stored in the first storage system, and Stub indicating that the file after the operation is reflected on the second storage system and, at the same time, the file is not stored in the first storage system.

8. A file management method by a file storage system comprising a plurality of nodes having a processor and a storage apparatus, the file storage system including a first storage system which stores a file by a distributed file system and performs input/output of the file for a client and a second storage system to which the file stored in the first storage system is transferred, the file storage system implementing a file virtualization function by the first storage system and the second storage system, the file storage system having a management information file, which includes a counter value indicating a time-series sequence and which is provided for each file, and an operation log in which operation content of the file is described together with the counter value, the method comprising:

performing an operation on the file stored in the first storage system on the basis of an operation request with respect to the file, and describing, in the operation log, the counter value of the management information file, associated with the file on which the operation is to be performed, together with the operation content with respect to the file, and moreover replying to the operation request;

updating the counter value of the management information file when the file stored in the first storage system is transferred to the second storage system;

when a failure occurs, identifying a relationship among operation content of the operation log, a file stored in the first storage system, and a file stored in the second storage system based on the counter value, and recovering consistency between the file and the management information file on the assumption that a partial state is Dirty when an update of the file is included in operation content of the file of which counter value is maximum, recovering consistency between the file and the management information file on the assumption that that the partial state is Cached when operation content of the file of which counter value is maximum is only migration processing of the file, and recovering consistency between the file and the management information file on the assumption that that the partial state is Stub when operation content of the file of which counter value is maximum is only stubbing processing of the file.

* * * * *